(12) United States Patent
Kudo et al.

(10) Patent No.: US 11,208,033 B2
(45) Date of Patent: Dec. 28, 2021

(54) LIGHTING CONTROL DEVICE AND METHOD OF VEHICULAR LAMP, AND VEHICULAR LAMP SYSTEM

(71) Applicant: STANLEY ELECTRIC CO., LTD., Tokyo (JP)

(72) Inventors: Kouki Kudo, Tokyo (JP); Yasushi Kita, Tokyo (JP); Takako Kimura, Tokyo (JP); Wataru Nakashima, Tokyo (JP); Shuto Oyama, Tokyo (JP); Akihisa Kumakura, Tokyo (JP); Hidetaka Okada, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 17/063,174

(22) Filed: Oct. 5, 2020

(65) Prior Publication Data
US 2021/0101523 A1 Apr. 8, 2021

(30) Foreign Application Priority Data
Oct. 3, 2019 (JP) .............................. JP2019-183057

(51) Int. Cl.
*B60Q 1/34* (2006.01)
*H05B 47/165* (2020.01)
*H05B 47/155* (2020.01)
*H05B 47/16* (2020.01)

(52) U.S. Cl.
CPC .......... *B60Q 1/346* (2013.01); *H05B 47/155* (2020.01); *H05B 47/16* (2020.01); *H05B 47/165* (2020.01)

(58) Field of Classification Search
CPC .... B60Q 1/346; H05B 47/165; H05B 47/155; H05B 47/16
See application file for complete search history.

(56) References Cited

U.S. PATENT DOCUMENTS

| | | | | |
|---|---|---|---|---|
| 9,586,521 B2* | 3/2017 | Lee | ......................... | B60Q 1/38 |
| 10,814,777 B2* | 10/2020 | Na | ....................... | H05B 47/155 |
| 2005/0062597 A1* | 3/2005 | Su | ............................ | B60Q 1/38 |
| | | | | 340/475 |

(Continued)

FOREIGN PATENT DOCUMENTS

| | | |
|---|---|---|
| JP | H07-335002 A | 12/1995 |
| JP | 2014-229510 A | 12/2014 |

*Primary Examiner* — Daniel D Chang
(74) *Attorney, Agent, or Firm* — Kenealy Vaidya LLP

(57) ABSTRACT

A vehicular lamp can enhance the impression of the direction indication due to the movement of light when performing sequential winker controls by sequentially turning off a plurality of light-emitting parts. A lighting control device for performing lighting control of the vehicular lamp including the plurality of light-emitting parts, includes processor circuitry configured to perform controls to repeat a lighting cycle including turning on the plurality of light-emitting parts and maintaining a lighting state of all the light-emitting parts, and then sequentially turning off the light-emitting parts in a predetermined direction with a time difference and maintaining a lights-out state of all the light-emitting parts in such a manner that a rise time from the lights-out state to the lighting state during energizing the light-emitting parts is made longer than a fall time from when the lighting state to the lights-out state during deenergizing the light-emitting parts.

16 Claims, 3 Drawing Sheets

(56) References Cited

U.S. PATENT DOCUMENTS

2012/0326606 A1* 12/2012 Rice .................. B60Q 1/38
                                              315/77
2013/0127612 A1*  5/2013 Stadler ............... B60Q 1/34
                                              340/465

* cited by examiner

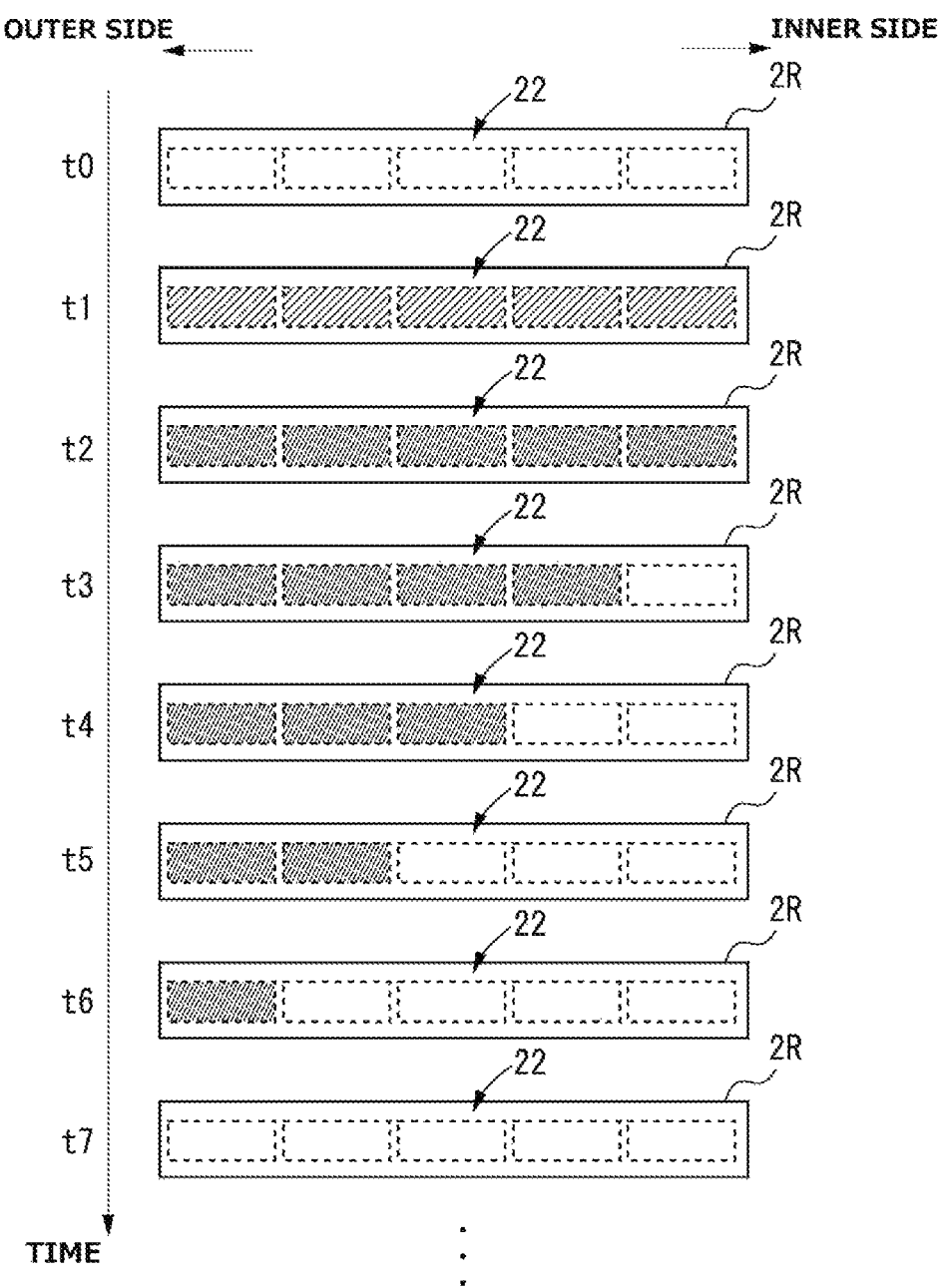

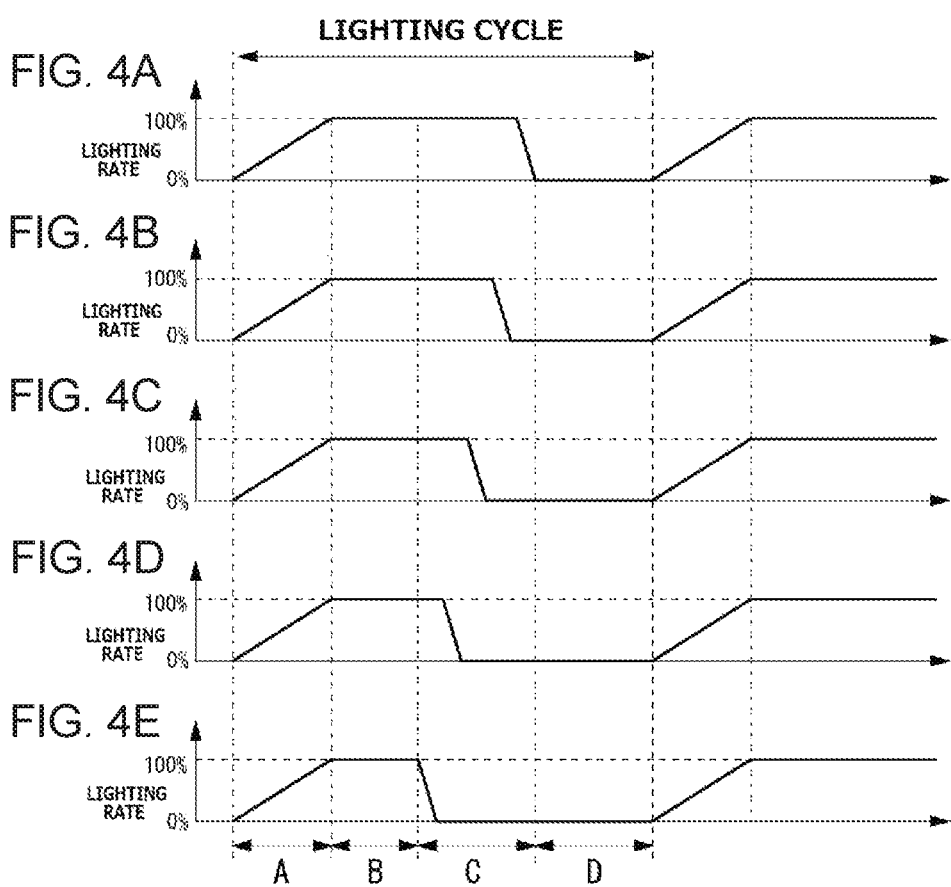

LIGHTING CONTROL DEVICE AND METHOD OF VEHICULAR LAMP, AND VEHICULAR LAMP SYSTEM

This application claims the priority benefit under 35 U.S.C. § 119 of Japanese Patent Application No. 2019-183057 filed on Oct. 3, 2019, which is hereby incorporated in its entirety by reference.

TECHNICAL FIELD

The presently disclosed subject matter relates to a vehicular lamp system used, for example, as a turn signal lamp or a direction indicator lamp.

BACKGROUND ART

As one type of a turn signal lamp used in a vehicle, there are known those having a plurality of light-emitting parts that are sequentially turned on or off with a time difference (for example, Japanese Patent No. 6066829). Such a lighting method is referred to herein as sequential blink or sequential winker. The vehicular indicator lamp such as a turn signal lamp described in the foregoing patent literature is controlled in such a manner that once the light-emitting parts in all areas where they are disposed are turned on so that all the areas become a lighting area, followed by sequentially turning off the light-emitting parts from the innermost one to the adjacent inner one and so on so as to widen the lights-out area from the inner side of the vehicle to the outer side. This control can perform the direction indication so that the boundary of the lighting area and the lights-out area appears to move (so-called "movement of light").

When the vehicular lamp utilizes such a control to gradually widen the lights-out area as described above, depending on the control conditions such as the speed of widening the lights-out area and the repetition period of lighting control, the impression of the direction indication by the movement of light may become poor.

SUMMARY

The presently disclosed subject matter was devised in view of these and other problems and features in association with the conventional art. According to an aspect of the presently disclosed subject matter, there is provided a technique capable of further enhancing the impression of the direction indication due to the movement of light when performing sequential winker control by sequentially turning off the light-emitting parts.

According to another aspect of the presently disclosed subject matter, a lighting control device of a vehicular lamp is a control device for performing lighting control of a vehicular lamp including a plurality of light-emitting parts, comprising processor circuitry configured to perform controls to repeat a lighting cycle including turning on the plurality of light-emitting parts and maintaining a lighting state of all the light-emitting parts, and then sequentially turning off the light-emitting parts in a predetermined (arranged) direction with a time difference and maintaining a lights-out state of all the light-emitting parts, in such a manner that a rise time from when a lighting rate of each of the light-emitting parts is substantially zero percent (lights-out state or turned-off state) to when the lighting rate of each of the light-emitting parts is substantially 100 percent (lighting state or turned-on state) during energizing the light-emitting parts is made longer than a fall time from when the lighting rate thereof is substantially 100 percent to when the lighting rate thereof is substantially zero percent during deenergizing the light-emitting parts.

According to still another aspect of the presently disclosed subject matter, a lighting control device of a vehicular lamp is a control device for performing lighting control of a vehicular lamp including a plurality of light-emitting parts, comprising processor circuitry configured to perform controls to repeat a lighting cycle including a first period in which the plurality of light-emitting parts which have been turned off are turned on, a second period in which a lighting state of the light-emitting parts is maintained, a third period in which the plurality of light-emitting parts are turned off sequentially in a predetermined (arranged) direction with a time difference, and a fourth period in which a lights-out state of the plurality of light-emitting parts is maintained, in such a manner that a rise time from when a lighting rate of each of the light-emitting parts is substantially zero percent (lights-out state or turned-off state) to when the lighting rate of each of the light-emitting parts is substantially 100 percent (lighting state or turned-on state) during energizing the light-emitting parts in the first period is made longer than a fall time from when the lighting rate thereof is substantially 100 percent to when the lighting rate thereof is substantially zero percent during deenergizing the light-emitting parts.

In the forgoing lighting control device, the rise time can be set to fall within a range of 1 msec or more and 330 msec or less.

Furthermore, in the foregoing lighting control device, a time during which the lights-out state of the plurality of light-emitting parts is maintained can be set to be 330 msec or more.

In the foregoing lighting control device, when the lighting cycle is 1000 msec, a time during which the lights-out of the plurality of light-emitting parts is maintained can be set to be not less than a number obtained by multiplying the lighting cycle by 0.333, and when the lighting cycle is 666 msec, a time during which the lights-out of the plurality of light-emitting parts is maintained can be set to be not less than a number obtained by multiplying the lighting cycle by 0.5.

In the foregoing lighting control device, the plurality of light-emitting parts that are turned off can be made turned on simultaneously.

According to still another aspect of the presently disclosed subject matter, a lighting control method of a vehicular lamp is a control method for performing lighting control of a vehicular lamp including a plurality of light-emitting parts, comprising performing controls to repeat a lighting cycle including turning on the plurality of light-emitting parts and maintaining a lighting state of all the light-emitting parts, and then sequentially turning off the light-emitting parts in a predetermined (arranged) direction with a time difference and maintaining a lights-out state of all the light-emitting parts, in such a manner that a rise time from when a lighting rate of each of the light-emitting parts is substantially zero percent (lights-out state or turned-off state) to when the lighting rate of each of the light-emitting parts is substantially 100 percent (lighting state or turned-on state) during energizing the light-emitting parts is made longer than a fall time from when the lighting rate thereof is substantially 100 percent to when the lighting rate thereof is substantially zero percent during deenergizing the light-emitting parts.

According to still another aspect of the presently disclosed subject matter, a lighting control method of a vehicular lamp is a control method for performing lighting control of a vehicular lamp including a plurality of light-emitting parts, comprising performing controls to repeat a lighting cycle including a first period in which the plurality of light-emitting parts which have been turned off are turned on, a second period in which a lighting state of the light-emitting parts is maintained, a third period in which the plurality of light-emitting parts are turned off sequentially in a predetermined (arranged) direction with a time difference, and a fourth period in which a lights-out state of the plurality of light-emitting parts is maintained, in such a manner that a rise time from when a lighting rate of each of the light-emitting parts is substantially zero percent (lights-out state or turned-off state) to when the lighting rate of each of the light-emitting parts is substantially 100 percent (lighting state or turned-on state) during energizing the light-emitting parts in the first period is made longer than a fall time from when the lighting rate thereof is substantially 100 percent to when the lighting rate thereof is substantially zero percent during deenergizing the light-emitting parts.

According to still further another aspect of the presently disclosed subject matter, a vehicular lamp system can include the foregoing lighting control device and a vehicular lamp controlled by the lighting control device.

According to the foregoing configurations, it is possible to further enhance the impression of the direction indication due to the movement of light when performing sequential winker controls by sequentially turning off the plurality of light-emitting parts.

BRIEF DESCRIPTION OF DRAWINGS

These and other characteristics, features, and advantages of the presently disclosed subject matter will become clear from the following description with reference to the accompanying drawings, wherein:

FIG. 3 is a diagram for describing the operation state of the vehicular lamp system;

FIGS. 4A to 4E are each a timing chart showing a time change of the lighting rate in each of light-emitting parts of the lamp unit;

FIG. 5 is a diagram for explaining the rise time and the fall time of the lighting rate.

DESCRIPTION OF EXEMPLARY EMBODIMENTS

A description will now be made below to vehicular lamp systems of the presently disclosed subject matter with reference to the accompanying drawings in accordance with exemplary embodiments.

Figure 1:
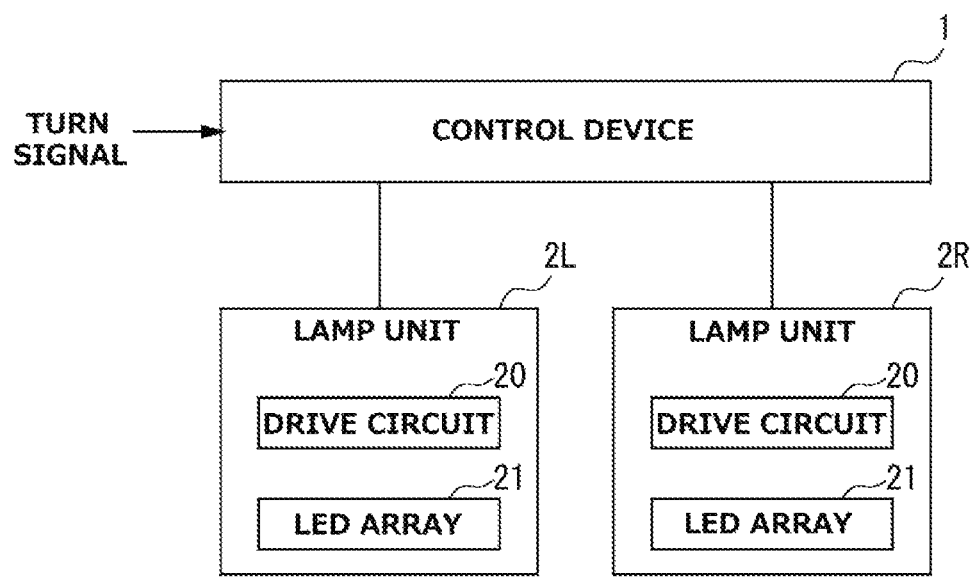
FIG. 1 is a block diagram showing a configuration of a vehicular lamp system according to an exemplary embodiment made in accordance with principles of the presently disclosed subject matter.

FIG. 1 is a block diagram showing a configuration of a vehicular lamp system according to an exemplary embodiment. The illustrated vehicular lamp system is configured to operate as a direction indicator lamp (turn signal lamp), and include a control device 1 and a pair of lamp units (vehicular lamps) 2L and 2R of which operation is controlled by the control device 1.

The control device 1, when a turn signal indicating that a direction indicator installed in a vehicle is operated is input thereto, controls the lighting state of any of the lamp units 2L and 2R in response to the turn signal, to illuminate light for indicating the traveling direction of the vehicle before turning.

Each of the lamp units 2L and 2R is configured to include a drive circuit 20, and an LED array 21. The lamp unit 2L is installed on the left side of the front of the vehicle while the lamp unit 2R is installed on the right side of the front of the vehicle. Note that a pair of lamp units may be similarly installed on the left and right sides of the rear of the vehicle. For simplicity of description, only a pair of lamp units 2L and 2R installed in the front of a vehicle will be described in the present exemplary embodiment.

The drive circuit 20 supplies a drive power to respective light-emitting elements (LEDs) included in the LED array 21 to turn on the respective LEDs or stop supplying of drive power to turn off the LEDs.

The LED array 21 is composed of the plurality of LEDs, each of which emits light by a drive power provided from the drive circuit 20.

Figure 2:
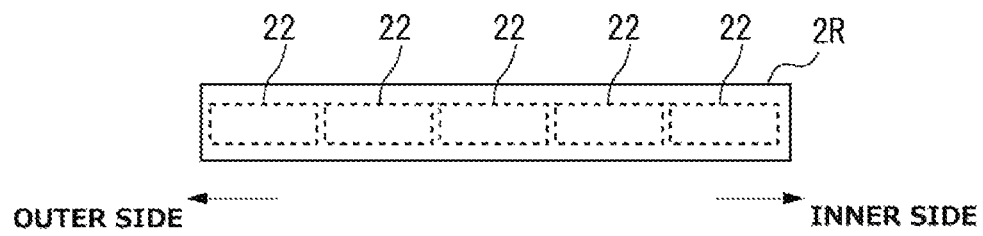
FIG. 2 is a plan view illustrating a configuration of a lamp unit of the vehicular lamp system when viewed from its front.

FIG. 2 is a plan view illustrating a configuration of the lamp unit of the vehicular lamp system when viewed from its front. Although FIG. 2 shows the lamp unit 2R, the lamp unit 2L has the same configuration symmetrical to that of the lamp unit 2R illustrated. The lamp unit 2R as illustrated includes a plurality of (five in the illustrated embodiment) light-emitting parts 22 arranged from the inner side of the vehicle (center side in the case of the lamp unit 2R) toward the outer side of the vehicle. The light-emitting parts 22 are associated with one or more of the LEDs included in the LED array 21, respectively. The respective light-emitting parts 22 can be independently turned on/off by the control of the drive circuit 20 as well as the brightness or luminance of each of the light-emitting parts 22 can be freely set by the control. In the following description, for convenience of illustration, it is assumed that the LEDs are associated with the respective light-emitting parts 22 by one-by-one correspondence.

FIG. 3 is a diagram for describing the operation state of the vehicular lamp system according to the present exemplary embodiment. Although only the lamp unit 2R is described in FIG. 3, the lamp unit 2L having the same symmetrical configuration can operate similarly to the lamp unit 2R. The luminance of the light is expressed by the density of the hatching in FIG. 3, and it is assumed that the higher density of the hatching indicates a state of high luminance.

When a turn signal is input at time t0, the control device 1 controls to supply a driving current to each of the light-emitting parts 22 which have been turned off until then to turn on the respective light-emitting parts 22. At this time, since the rise time of the drive current has been set relatively long, the lighting rate of each of the light-emitting parts 22 is gradually increased until the lighting rate reaches the maximum value set in advance (lighting rate being 100% as an example). The state at time t1 shown in FIG. 3 shows an intermediate state of the lighting rate in the middle of the lighting rate being increased. Then, at time t2, the lighting rate of the light emitted from each of the light-emitting parts 22 reaches the set maximum value.

After that, the first light-emitting part 22 which is positioned at the innermost position of the vehicle is turned off at time t3 after the state where lighting rate is the maximum value is maintained to some extent. After that, the second light-emitting part 22 from the vehicle inside is turned off at time t4, the third light-emitting part 22 from the vehicle inside is turned off at time t5, the fourth light-emitting part 22 from the vehicle inside is turned off at time t6, and the fifth light-emitting part 22 from the vehicle inside is turned off at time t7. After time t7, a lights-out duration of a predetermined length is provided. After the lights-out duration has elapsed, the next lighting cycle starts and the operations after time t0 are repeated.

By the above-mentioned series of turning-on/off control, the direction indication display that repeats the lighting cycle is realized, where a single lighting cycle sequentially includes a state where all of the light-emitting parts 22 in the areas corresponding to the light-emitting parts 22 of the lamp unit 2R are switched from off to on, a state where the turning-off areas are sequentially increased from the vehicle inside toward the vehicle outside with a time difference, and a state where the turning-off is maintained for a certain period of time after all of the light-emitting parts 22 in the areas corresponding to the light-emitting parts 22 are turned off. At this time, in the present exemplary embodiment, the rise time and fall time of the lighting rate, as well as the relationship between the lighting section and the lights-out section (lights-out duration) are set under predetermined conditions, to enhance the impression of the direction indication. Details thereof will be described below.

FIGS. 4A to 4E are each a timing chart showing a time change of the lighting rate in each light-emitting part of the lamp unit. Herein, a description will also be given of the lamp unit 2R, and the same will be applied to the lamp unit 2L. FIG. 4A is a lighting rate waveform corresponding to the outermost light-emitting part 22, FIG. 4B is a lighting rate waveform corresponding to the second light-emitting part 22 from the outside, FIG. 4C is a lighting rate waveform corresponding to the third light-emitting part 22 from the outside, FIG. 4D is a lighting rate waveform corresponding to the fourth light-emitting part 22 from the outside, and FIG. 4E is a lighting rate waveform corresponding to the innermost light-emitting part 22. Incidentally, the luminance in each light-emitting part 22 as described below can be controlled by the magnitude of the driving current given to the LED of each light-emitting part 22 from the drive circuit 20 in accordance with the control by the control device 1. Furthermore, the lighting rate corresponds to the luminance of the light emitted from each light-emitting part 22.

As shown in each figure, in the first section A, substantially simultaneously, all the light-emitting parts 22 are controlled so as to gradually increase the lighting rate from a preset minimum value of the lighting rate (0% of the lighting rate as an example herein) to a maximum value (100% of the lighting rate as an example herein). After the lighting rate of each light-emitting part 22 becomes the maximum value, the state in the second section B is maintained. In the next third section C, first, the lighting rate of the innermost light-emitting part 22 is controlled to decrease to the minimum value (0%) (FIG. 4E). Then, the lighting rate of the second light-emitting part 22 from the inside is controlled to decrease to the minimum value (0%) (FIG. 4D), then the lighting rate of the third light-emitting part 22 from the inside is controlled to decrease to the minimum value (0%) (FIG. 4C), and then the lighting rate of the fourth light-emitting part 22 from the inside is controlled to decrease to the minimum value (0%) (FIG. 4B). Finally the lighting rate of the outermost light-emitting part 22 is controlled to decrease to the minimum value (0%) (FIG. 4A). After the lighting rate of all the light-emitting parts 22 becomes the minimum value, the lights-out state is reached and maintained in the fourth section D. After that, the lighting cycle consisting of these first section A, second section B, third section C, and fourth section D is repeated.

It is preferable that the length of the fourth section corresponding to the above-mentioned lights-out state be set to 333 msec or longer, and more preferably 400 msec or longer. The length of the fourth section may be determined by the ratio with respect to the lighting cycle. For example, when the lighting cycle is set to 1000 msec, it is desirable that the length of the fourth section be 33.3% or more of the lighting cycle (i.e., not less than the number obtained by multiplying the lighting cycle by 0.333). As another example, when the lighting cycle is set to 666 msec, it is desirable that the length of the fourth section be 50% or more of this lighting cycle (i.e., not less than the number obtained by multiplying the lighting cycle by 0.5). In order to sufficiently ensure the length of the fourth section, for example, the lighting cycle may be set longer. Alternatively, it is also conceivable that the length of the fourth section can be shortened by simultaneously turning off a plurality of (e.g., three) light-emitting parts 22 close to the outer side of the vehicle rather than turning off them in a time difference manner.

FIG. 5 is a diagram for explaining the rise time and the fall time of the lighting rate. As shown, the rise time of the lighting rate of the light-emitting part 22 is defined as a time required for the lighting rate to reach a predetermined maximum value (100% as an example) from a predetermined minimum value (0% as an example). Further, the fall time of the lighting rate of the light-emitting part 22 is defined as a time required for the lighting rate to reach a predetermined minimum value (0% as an example) from a predetermined maximum value (100% as an example). Herein, the waveform at the rise time of the lighting rate and the waveform at the fall time thereof each show a linear change, although the aspects of the change are not limited thereto. For example, a change such as those represented by an exponential function or a sigmoidal function, or a change in a stepwise manner may be performed.

In the present exemplary embodiment, the relation between the rise time $T_U$ and the fall time $T_D$ of the lighting rate in each of the light-emitting parts 22 is set so as to satisfy $T_U > T_D$. In the present exemplary embodiment, the rise time $T_U$ is set within a range of 1 msec $\leq T_U \leq$ 330 msec. The fall time $T_D$ is set so as to satisfy $T_U > T_D$ while the rise time satisfies the foregoing condition. That is, the present exemplary embodiment is configured to control so as to ensure a relatively long rise time of the lighting rate in each light-emitting part. It should be noted that, in the present exemplary embodiment, the rise time is consistent with the length of the first section A described above.

As an example, the effects of the present exemplary embodiment had been verified by means of a vehicular lamp system in which the first section A (=rise time) was set to 150 msec, the second section B was set to 50 msec, the third section C was set to 200 msec, and the fourth section D was set to 400 msec. As a comparative example, there was used a comparative vehicular lamp system in which the first section A (=rise time) was set to substantially 0 sec, the second section B was set to 133 msec, the third section C was set to 200 msec, and the fourth section D was set to 333 msec. When the operation of each of the vehicular lamp systems of Example and Comparative Example was evaluated by 10 subjects, the result was obtained such that 10 subjects felt the impression of direction indication more strongly by light from the vehicular lamp system of Example.

According to the exemplary embodiment as described above, it is possible to further enhance the impression of the direction indication due to the movement of light when performing sequential winkers by sequentially turning off the light-emitting parts.

The presently disclosed subject matter is not limited to the contents of the foregoing exemplary embodiment, and can be variously modified and implemented within the scope of the gist of the presently disclosed subject matter. For example, although the presently disclosed subject matter is applied to a vehicular lamp system used as a turn signal lamp in the exemplary embodiment described above, the scope of application of the presently disclosed subject matter is not limited to this, and the presently disclosed subject matter can be applied to various vehicular lamp systems mounted on a vehicle and irradiating light to the periphery thereof. For example, in the exemplary embodiment described above, the lamp units 2L and 2R are selectively operated in response to a turn signal, but when a hazard signal is given, the lamp units 2L and 2R may be simultaneously operated by the control method described above.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A lighting control device for performing lighting control of a vehicular lamp including a plurality of light-emitting parts, comprising processor circuitry configured to perform controls to repeat a lighting cycle including turning on the plurality of light-emitting parts and maintaining a lighting state of all the light-emitting parts, and then sequentially turning off the light-emitting parts in a predetermined direction with a time difference and maintaining a lights-out state of all the light-emitting parts, in such a manner that a rise time from the lights-out state to the lighting state during energizing the light-emitting parts is made longer than a fall time from the lighting state to the lights-out state during deenergizing the light-emitting parts, wherein the plurality of light-emitting parts that are turned off are made to turn back on simultaneously.

2. The lighting control device according to claim 1, wherein the rise time is set to fall within a range of 1 msec or more and 330 msec or less.

3. The lighting control device according to claim 2, wherein a time during which the lights-out state of the plurality of light-emitting parts is maintained is set to be 330 msec or more.

4. The lighting control device according to claim 2, wherein
when the lighting cycle is 1000 msec, a time during which the lights-out of the plurality of light-emitting parts is maintained is not less than a number obtained by multiplying the lighting cycle by 0.333, and
when the lighting cycle is 666 msec, a time during which the lights-out of the plurality of light-emitting parts is maintained is not less than a number obtained by multiplying the lighting cycle by 0.5.

5. The lighting control device according to claim 1, wherein a time during which the lights-out state of the plurality of light-emitting parts is maintained is set to be 330 msec or more.

6. The lighting control device according to claim 1, wherein
when the lighting cycle is 1000 msec, a time during which the lights-out of the plurality of light-emitting parts is maintained is not less than a number obtained by multiplying the lighting cycle by 0.333, and
when the lighting cycle is 666 msec, a time during which the lights-out of the plurality of light-emitting parts is maintained is not less than a number obtained by multiplying the lighting cycle by 0.5.

7. A vehicular lamp system comprising the lighting control device according to claim 1, and a vehicular lamp controlled by the lighting control device.

8. A lighting control device for performing lighting control of a vehicular lamp including a plurality of light-emitting parts, comprising processor circuitry configured to perform controls to repeat a lighting cycle including a first period in which the plurality of light-emitting parts which have been turned off are turned on, a second period in which a lighting state of the light-emitting parts is maintained, a third period in which the plurality of light-emitting parts are turned off sequentially in a predetermined direction with a time difference, and a fourth period in which a lights-out state of the plurality of light-emitting parts is maintained, in such a manner that a rise time from the lights-out state to the lighting state during energizing the light-emitting parts in the first period is made longer than a fall time from the lighting state thereof to the lights-out state during deenergizing the light-emitting parts, wherein the plurality of light-emitting parts that are turned off are made to turn back on simultaneously.

9. The lighting control device according to claim 8, wherein the rise time is set to fall within a range of 1 msec or more and 330 msec or less.

10. The lighting control device according to claim 9, wherein a time during which the lights-out state of the plurality of light-emitting parts is maintained is set to be 330 msec or more.

11. The lighting control device according to claim 9, wherein
when the lighting cycle is 1000 msec, a time during which the lights-out of the plurality of light-emitting parts is maintained is not less than a number obtained by multiplying the lighting cycle by 0.333, and
when the lighting cycle is 666 msec, a time during which the lights-out of the plurality of light-emitting parts is maintained is not less than a number obtained by multiplying the lighting cycle by 0.5.

12. The lighting control device according to claim 8, wherein a time during which the lights-out state of the plurality of light-emitting parts is maintained is set to be 330 msec or more.

13. The lighting control device according to claim 8, wherein
when the lighting cycle is 1000 msec, a time during which the lights-out of the plurality of light-emitting parts is maintained is not less than a number obtained by multiplying the lighting cycle by 0.333, and
when the lighting cycle is 666 msec, a time during which the lights-out of the plurality of light-emitting parts is maintained is not less than a number obtained by multiplying the lighting cycle by 0.5.

14. A vehicular lamp system comprising the lighting control device according to claim 8, and a vehicular lamp controlled by the lighting control device.

15. A lighting control method for performing lighting control of a vehicular lamp including a plurality of light-emitting parts, comprising performing controls to repeat a lighting cycle including turning on the plurality of light-emitting parts and maintaining a lighting state of all the light-emitting parts, and then sequentially turning off the light-emitting parts in a predetermined direction with a time difference and maintaining a lights-out state of all the light-emitting parts, in such a manner that a rise time from the lights-out state to the lighting state during energizing the light-emitting parts is made longer than a fall time from the lighting state to the lights-out state during deenergizing the light-emitting parts, further comprising causing the plurality of light-emitting parts that are turned off to turn back on simultaneously.

16. A lighting control method for performing lighting control of a vehicular lamp including a plurality of light-emitting parts, comprising performing controls to repeat a lighting cycle including a first period in which the plurality of light-emitting parts which have been turned off are turned on, a second period in which a lighting state of the light-emitting parts is maintained, a third period in which the plurality of light-emitting parts are turned off sequentially in a predetermined direction with a time difference, and a fourth period in which a lights-out state of the plurality of light-emitting parts is maintained, in such a manner that a rise time from the lights-out state to the lighting state during energizing the light-emitting parts in the first period is made longer than a fall time from the lighting state to the lights-out state during deenergizing the light-emitting parts, further comprising causing the plurality of light-emitting parts that are turned off to turn back on simultaneously.

* * * * *